United States Patent [19]

Hart

[11] 3,718,179

[45] Feb. 27, 1973

[54] REGENERATOR SEAL

[75] Inventor: Jack P. Hart, Hinsdale, Ill.

[73] Assignee: General Motors Corporation, Detroit, Mich.

[22] Filed: Nov. 11, 1971

[21] Appl. No.: 197,675

Related U.S. Application Data

[62] Division of Ser. No. 879,729, Nov. 25, 1969, Pat. No. 3,638,716.

[52] U.S. Cl. ................................................. 165/9
[51] Int. Cl. ........................................... F28d 19/04
[58] Field of Search ............................ 165/8, 9, 10

[56] References Cited

UNITED STATES PATENTS 3,384,156  5/1968  Addie ............................... 165/9 X Primary Examiner—Albert W. Davis, Jr.
Attorney—Paul Fitzpatrick et al.

[57] ABSTRACT

A rotary regenerator of the drum matrix type includes main seals engaging the matrix where it passes through the bulkhead of the regenerator. Each main seal includes a frame closely encircling the matrix with particular means for connecting the main seal to the bulkhead. The connecting means includes a support bar fixed to the bulkhead having a segmented flange extending from the bulkhead and a seal bar forming part of the main seal having the flange overlapping the flange of the support bar. The two flanges are coupled together so as to be relatively expansible in response to diverse temperature conditions in operation of the regenerator. This disclosure incorporated by reference to the parent application, now U.S. Pat. No. 3,638,716

2 Claims, 1 Drawing Figure

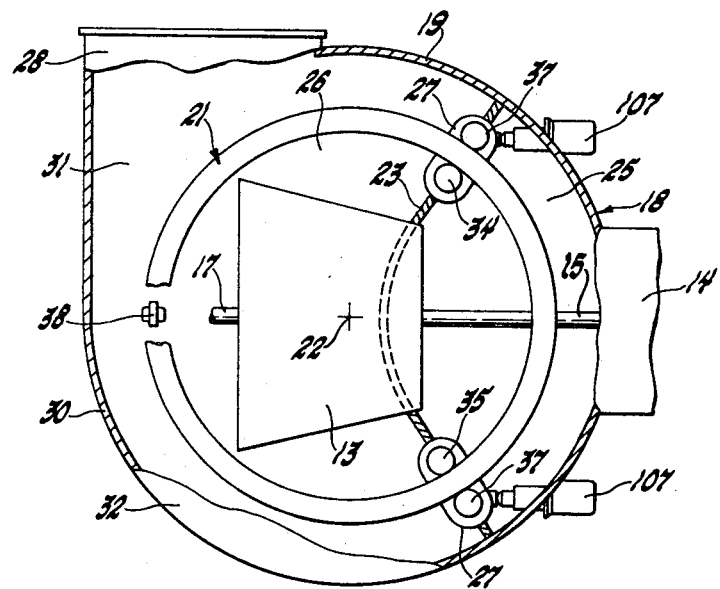

REGENERATOR SEAL

This application is a division of my application Ser. No. 879,729 for Regenerator Seal filed Nov. 25, 1969 now U.S. Pat. No. 3,638,716.

SUMMARY OF THE INVENTION

My invention relates to regenerators, by which I mean heat exchange devices of the sort in which a heat retaining mass is rotated so as to move alternately through the flow paths of two fluids so as to absorb heat from the hotter fluid and release it to the cooler. In some respects, it is particularly concerned with a regenerator having a drum matrix in which flow takes place radially through an annular drum, and with one suited to a gas turbine type of installation.

The particular subject matter of this application is an improved connection between the frame of a main seal of the regenerator and the bulkhead, which is a portion of the regenerator case. The connection incorporates relatively slidable members to permit relative expansion of the parts as temperature changes. The principal objects of the invention are to provide improved structure of a regenerator main seal and its supports, to increase sealing efficiency, and to accommodate relative thermal expansion of the parts of the regenerator.

DESCRIPTION OF THE DRAWING

The FIGURE is a somewhat schematic side view, with parts cut away, of a regenerative gas turbine arrangement.

DETAILED DESCRIPTION

For a complete description of the regenerator seal of the FIGURE and of my invention claimed herein, reference is made to my U.S. Patent application Ser. No. 879,729 for Regenerator Seal, filed Nov. 25, 1969, now U.S. Pat. No. 3,638,716.

Substantially the entire specification and drawings of that application are pertinent to an understanding of the subject matter of this invention in its preferred embodiment.

Reference is made to the specification and drawings of Ser. No. 879,729 which are incorporated herein by reference and made a part hereof as if fully described herein.

The portions of the disclosure of Ser. No. 879,729 which are most pertinent to the subject matter claimed herein are set out from column 6, line 48 through column 8, line 14 of the patent specification and in FIGS. 2, 11, 12, and 13 of the drawings; therefore, attention is particularly directed to those portions.

CONCLUSION

It should be clear to those skilled in the art from the foregoing that the seal described and claimed herein represents a significant improvement over prior art devices and is particularly suited to the requirements of gas turbine regenerator installations.

The detailed description of the preferred embodiment of the invention for the purpose of explaining the principles thereof is not to be considered as limiting or restricting the invention, as many modifications may be made by the exercise of skill in the art.

I claim:

1. A rotary regenerator including a case, a bulkhead, a rotatable annular radial-flow matrix, and main seals cooperating with the matrix at the bulkhead, each main seal comprising a frame closely encircling the matrix, in combination with means for mounting a main seal on the bulkhead, the said mounting means comprising, in combination, a support bar fixed to the bulkhead, the support bar including first flange means extending from the bulkhead, the flange means being segmented with gaps between the segments; and a seal bar forming part of the main seal mounted on the support bar, the seal bar including second flange means overlapping the flange means on the support bar; the first and second flange means being coupled together so as to be relatively expansible in response to diverse temperature conditions of the support bar and seal bar.

2. A rotary regenerator including a case, a bulkhead, a rotatable annular radial-flow matrix, and main seals cooperating with the matrix at the bulkhead, each main seal comprising a frame closely encircling the matrix, in combination with means for mounting a main seal on the bulkhead, the said mounting means comprising, in combination, a support bar fixed to the bulkhead, the support bar including first flange means extending from the bulkhead, the flange means being segmented with gaps between the segments; a seal bar forming part of the main seal mounted on the support bar, the seal bar including second flange means overlapping the flange means on the support bar; the first and second flange means being coupled together so as to be relatively expansible in response to diverse temperature conditions of the support bar and seal bar; and a filler strip extending parallel to the said bars and relatively expansible thereto, the filler strip covering the said gaps in the flange means.

* * * * *